(12) United States Patent
Hall et al.

(10) Patent No.: US 7,565,688 B2
(45) Date of Patent: Jul. 21, 2009

(54) NETWORK DEMONSTRATION TECHNIQUES

(75) Inventors: Eric P. Hall, Allen, TX (US); Robert E. Horstman, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1302 days.

(21) Appl. No.: 10/326,287

(22) Filed: Dec. 23, 2002

(65) Prior Publication Data

US 2004/0122960 A1 Jun. 24, 2004

(51) Int. Cl.
*G06F 7/04* (2006.01)
*H04L 29/06* (2006.01)

(52) U.S. Cl. .......................................... 726/5; 713/168
(58) Field of Classification Search ................. 713/168; 726/5

See application file for complete search history.

(56) References Cited

U.S. PATENT DOCUMENTS

| | | | | |
|---|---|---|---|---|
| 6,112,206 | A * | 8/2000 | Morris et al. | 707/10 |
| 6,216,117 | B1 * | 4/2001 | Hall | 705/400 |
| 6,614,774 | B1 * | 9/2003 | Wang | 370/338 |
| 6,650,902 | B1 * | 11/2003 | Richton | 455/456.3 |
| 6,714,987 | B1 * | 3/2004 | Amin et al. | 709/249 |
| 6,769,000 | B1 * | 7/2004 | Akhtar et al. | 707/103 R |
| 6,772,213 | B2 * | 8/2004 | Glorikian | 709/228 |
| 6,895,310 | B1 * | 5/2005 | Kolls | 701/1 |
| 6,980,812 | B1 * | 12/2005 | Sandhu et al. | 455/456.1 |
| 2002/0012433 | A1 | 1/2002 | Haverinen et al. | |
| 2002/0046104 | A1 * | 4/2002 | Kaddeche et al. | 705/14 |
| 2002/0073240 | A1 * | 6/2002 | Kokkinen et al. | 709/249 |
| 2002/0151271 | A1 * | 10/2002 | Tatsuji et al. | 455/3.05 |
| 2002/0164998 | A1 * | 11/2002 | Younis | 455/456 |

(Continued)

FOREIGN PATENT DOCUMENTS

EP 1 081 895 3/2001

(Continued)

OTHER PUBLICATIONS

Frost & Sullivan, "Welcome to Funk Software," Funk Software, Inc., Cambridge, MA, http://www.funk.com/, 1 page.

(Continued)

*Primary Examiner*—Matthew B Smithers
*Assistant Examiner*—Techane J Gergiso

(57) ABSTRACT

Network demonstration techniques are disclosed which allow a fully-operational, secure wireless network to be implemented at a customer location. Using only a portable authentication server, a laptop computer, and at least two access points, a wireless network can be set up at the customer location within a matter of minutes, so that a user of a portable computing device having an appropriate network interface card is able to roam throughout the customer location with the benefit of a wireless connection to one of the access points. The laptop computer contains software integrating the functionality of a security server, a user authentication database, and other components necessary to implement the wireless network. The user may also be able to communicate with the laptop computer and authentication server from locations external to the customer location, perhaps using a wireless wide area network or secondary wireless local area network. Using the network demonstration and related information about the customer, accurate cost estimates for installing a company-wide wireless network can be generated.

33 Claims, 6 Drawing Sheets

U.S. PATENT DOCUMENTS

| | | | |
|---|---|---|---|
| 2002/0174010 A1* | 11/2002 | Rice, III | 705/14 |
| 2002/0177453 A1 | 11/2002 | Chen et al. | |
| 2003/0028612 A1* | 2/2003 | Lin et al. | 709/217 |
| 2003/0040944 A1* | 2/2003 | Hileman | 705/5 |
| 2003/0045311 A1* | 3/2003 | Larikka et al. | 455/466 |
| 2003/0054810 A1* | 3/2003 | Chen et al. | 455/422 |
| 2003/0056096 A1* | 3/2003 | Albert et al. | 713/168 |
| 2003/0112977 A1* | 6/2003 | Ray et al. | 380/270 |
| 2003/0157959 A1* | 8/2003 | Makela et al. | 455/556 |

FOREIGN PATENT DOCUMENTS

| | | | |
|---|---|---|---|
| EP | 1209928 A2 * | 5/2002 | |
| WO | WO 0124476 | 4/2001 | |
| WO | WO0163877 A1 * | 8/2001 | |
| WO | WO 02/063847 | 8/2002 | |
| WO | WO 03/094438 | 11/2003 | |

OTHER PUBLICATIONS

"Solutions for Securing Wireless & Wired Networks," http://www.interlinknetworks.com/, 2 pages.

"Meetinghouse Data Communications: Securing the Mobile Network," http://www.mtghouse.com/index.shtml, pp. 1-4.

"Port-Based Network Access Control," IEEE STD 802.1X, Jul. 13, 2001, pp. i-viii and 1-56.

A. Sikora, "Sicherheit in Wireless LANS," Elektronik, Franzis Verlag GMBH, Munchen, DE, vol. 51, No. 18, Sep. 3, 2002, pp. 44-52 (with Concise English language Statement of Relevance).

International Search Report, May 21, 2004, 8 pages.

Examiner's First Report issued by Australian Government—IP Australia on counterpart Australian Patent Application No. 2003299842, dated Jul. 21, 2008 (2 pages).

EPO, Communication pursuant to Article 96(2) EPC, May 2, 2006, Application No. 03 800 116.0-2413, 5 pages.

* cited by examiner

NETWORK DEMONSTRATION TECHNIQUES

TECHNICAL FIELD

This description relates to computer networks, and more particularly to techniques for demonstrating operability of computer networks.

BACKGROUND

Conventional systems exist which allow a user to connect to a network or otherwise communicate with another user without requiring a wired connection. For example, wireless local area networks ("wireless LANs," or "WLANs") may allow a network user within a building to roam throughout the building with a portable computing device such as a laptop or handheld computer, all the while maintaining connectivity to the network. Somewhat similarly, wireless wide area networks ("wireless WANs," or "WWANs") allow a network user to connect to the network from, and/or roam over, a much wider area. Many other examples of wireless networks exist. On such network is a "hot-spot" implemented in a convenient public setting, such as a coffee shop, for providing users (e.g., customers of the coffee shop) with a network (e.g., Internet) connection.

Such wireless networks offer ease of installation and use, as well as the potential for substantial cost savings to the administrators and users of the networks.

SUMMARY

According to one general aspect, an authentication server is transported to a customer location, where the authentication server is operable to implement a user-specific and session-specific security policy for authenticating a user. A security server is also transported to the customer location, where the security server is operable to interact with the authentication server and a user database storing user-specific authentication information to implement the security policy. A port on the authentication server is activated, and the user is authenticated at the port on the authentication server, using the security server and a first portable computing device operated by the user.

Implementations may include one or more of the following features. For example, the security server may be transported by integrating the security server and the user database onto a second portable computing device.

In integrating the security server and the user database, a certificate authority may be integrated onto the second portable computing device, where the certificate authority is operable to provide and validate a digital certificate for use in implementing the security policy. Also, a network address assignment server may be integrated onto the second portable computing device, where the network address assignment server is operable to assign a network address to the first portable computing device.

A first connection location and a second connection location may be obtained for the customer location, and a first wireless access point and a second wireless access point may be transported for installation at the first connection location and the second connection location, respectively, whereby the first access point and the second access point are in communication with the security server.

In this case, the first portable computing device may be operable to communicate with the first wireless access point, via a wireless network interface card, when the first portable computing device is within a pre-determined distance of the first wireless access point. Further, the first portable computing device may be transported to the customer location with the network interface card pre-installed and pre-configured. Also, the network interface card may be installed on the first portable computing device, wherein the first portable computing device is supplied by the user.

Customer information may be obtained, where the customer information includes an available network address and user authentication information associated with the user, and the user authentication information may be stored in the user database. The customer information may be obtained prior to transporting the authentication server and the security server to the customer location. Also, in authenticating the user, the user may be authenticated based on the network address and the user authentication information.

Data traffic between the user and the security server that is subsequent to authenticating the user may be encrypted, using an encryption/decryption key. In this case, the encryption/decryption key may be changed after a predetermined period of time. Also, the encryption/decryption key may be changed after a predetermined amount of the data traffic has been transmitted. Also, the encryption/decryption key may be changed upon a beginning of a new session by the user, where the beginning of the new session may be defined by an ending of a first communication between the user and a first access point communicating with the security server and a beginning of a second communication between the user and a second access point communicating with the security server.

The first portable computing device may maintain a wireless connection to an access point located at a site external to the customer location. The access point located at the external site may be a broadcasting tower implementing a wireless wide area network. Also, the access point located at the external site may be connected to the security server via a wide area network and through a gateway device at the customer location.

The user may be authenticated at the security server and via a gateway device located at the customer location, while the user is at a location external to the customer location.

An automated method of pricing a potential wireless network, based on the demonstrated wireless network and using a computer programmed with spreadsheet software, may be implemented. The automated method may include inputting a first data set describing physical characteristics of the customer location into the spreadsheet software, inputting a second data set describing existing network conditions at the customer location into the spreadsheet software, inputting a third data set describing customer-desired characteristics of the potential wireless network into the spreadsheet software, and estimating a cost for installing the potential wireless network, based on the first data set, second data set, and third data set.

According to another general aspect, a system for demonstrating a wireless network includes a first portable access point, a second portable access point, a database containing user authentication information, a portable authentication server operable to implement a user-specific and session-specific security policy, a portable security server operable to interact with the database and the portable authentication server to activate a port on the portable authentication server, and a first portable computing device including a wireless network interface card operable to communicate with the portable security server through the first portable access point and the second portable access point. A user of the portable computing device is authenticated at the port on the portable authentication server, based on the user authentication information and the security policy.

Implementations may include one or more of the following features. For example, the portable security server and the database may be integrated onto a second portable computing device. Also, a certificate authority may be integrated onto the second portable computing device, and the certificate authority may be operable to provide and validate a digital certificate for use in implementing the security policy.

Further, a network address assignment server may be integrated onto the second portable computing device, and the network address assignment server may be operable to assign a network address to the first portable computing device.

Data traffic between the user and the security server that is subsequent to authenticating the user may be encrypted using an encryption key. The encryption key may be changed after a predetermined period of time. Also, the encryption key may be changed after a predetermined amount of the data traffic has been transmitted. Further, the encryption key may be changed upon a beginning of a new session by the user.

The first portable computing device may maintain a wireless connection to an access point located at a site external to the portable security server and portable authentication server. The access point located at the external site may be a broadcasting tower implementing a wireless wide area network. Also, the access point located at the external site may be connected to the portable security server via a wide area network and through a gateway device co-located with the portable security server and the portable authentication server.

The user may be authenticated at the security server and via a gateway device co-located with the portable security server and the portable authentication server, via a wide area network that is external to the gateway device.

The details of one or more implementations are set forth in the accompanying drawings and the description below. Other features will be apparent from the description and drawings, and from the claims.

DETAILED DESCRIPTION

Figure 1:
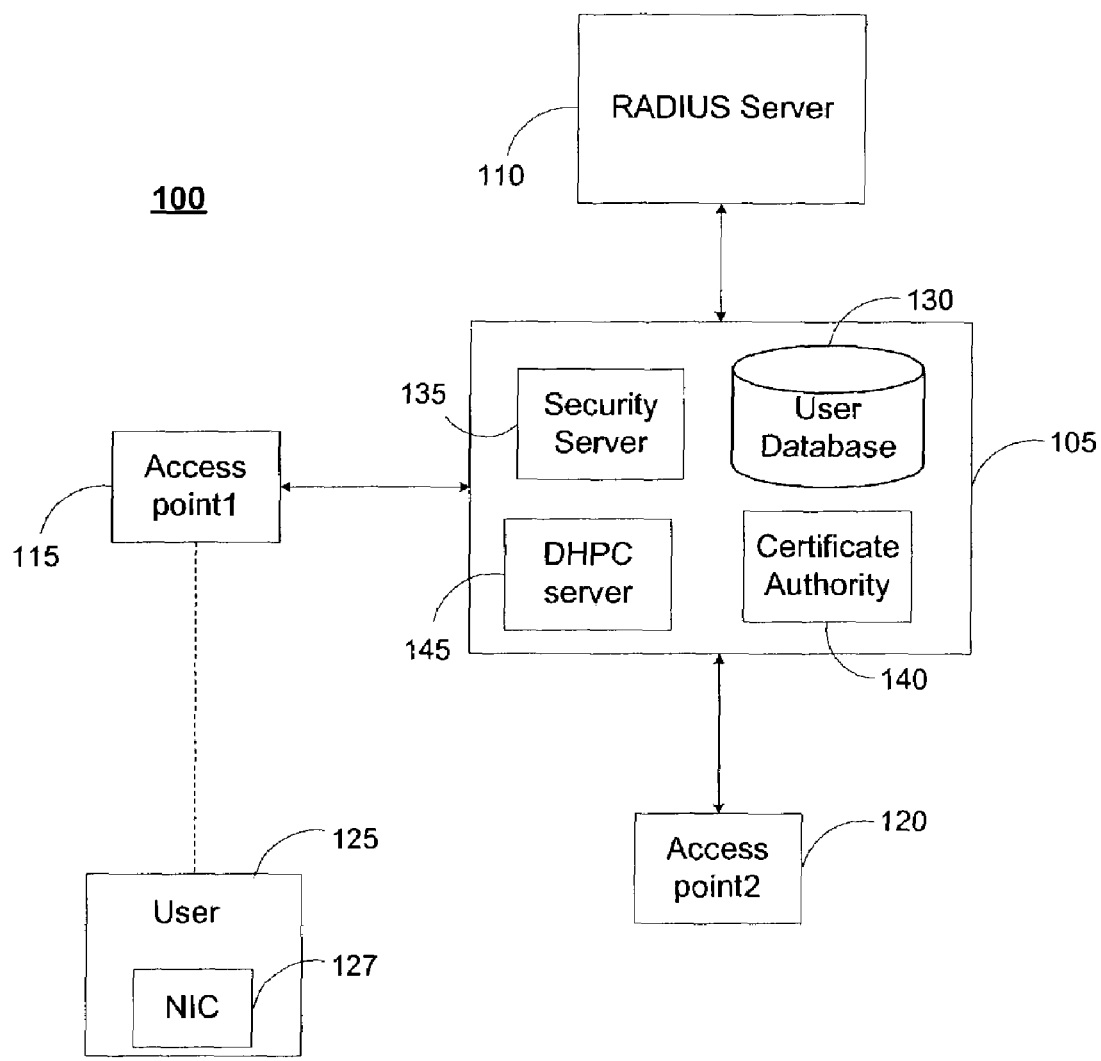
FIG. 1 is a block diagram of a wireless network demonstration system.

FIG. 1 is a block diagram of a wireless network demonstration system 100. As will be described, system 100 may be easily transported to a customer site and used to demonstrate a wireless network to a potential customer, such as an enterprise or an Internet Service Provider ("ISP"). In FIG. 1, a portable computing device 105 may be, for example, a laptop computer or handheld device, such as an iPAQ PocketPC by Compaq. Although the portable computing device 105 may be any number of such portable computing devices, it will be referred to in the examples below, for the sake of illustration, as a laptop computer, or, more simply, a laptop. Laptop 105 contains various elements needed to implement a wireless network, as described in more detail below.

Laptop 105 is connected to a server 110. Server 110 may be, for example, a portable Remote Authentication Dial-In User Service ("RADIUS") server. Such a RADIUS server 110 is used in a client/server authentication process, as is also described below, and may be, for example, a "Steel-Belted RADIUS Server" produced by Funk Software.

A first access point 115 and a second access point 120 (as well as additional access points, as needed) are installed as part of system 100 at distributed locations around the customer site. Such access points 115 and 120 may be, for example, Cisco Aironet 350 WLAN access points.

Using system 100, a wireless network may be installed and fully operational at a customer site within a matter of, for example, fifteen minutes or less. In this way, a user 125 may be connected and authenticated to the system 100, and thereafter be free to roam throughout the customer site (within range of the access points 115 and 120), all the while remaining connected (through access points 115 or 120) to laptop 105 and server 110, and thereby to another network, such as a customer network or the Internet. In connecting to the wireless network, the user 125 may use a network interface card ("NIC") 127, as discussed in more detail below.

It should be understood that user 125 may represent a portable computing device, such as a laptop, that is brought to the customer site along with laptop 105, authentication server 110, and access points 115 and 120. Additionally, or alternatively, user 125 may represent a laptop or other portable computing device of a local employee of the customer, with a NIC installed on the laptop as part of setting up a demonstration of system 100. When referring to NICs, it should be understood that a NIC and/or related client software installed on a computer of user 125 may include the actual network interface card(s), as well as any software drivers or client security software that may be required.

Laptop 105 contains various elements needed to implement a demonstration of a wireless network. For example, laptop 105 may include a user database 130 containing information about at least one user, for use in, for example, authenticating the user. Similarly to the NIC, information about the user(s) may be generated for the purposes of the demonstration, or may be information about an actual user at the customer site, such as a local employee.

Laptop 105 may also contain a security server 135, for use in implementing various security protocols designed to protect network traffic to and from the user 125. Security server 135 may also be used to add/remove users such as user 125 from the system 100. Such a security server 135 may include, for example, an Odyssey security server produced by Funk Software.

Assuming that the security protocol(s) involve the use of encryption/decryption keys in the context of a digital certificate(s), laptop 105 also includes a certificate authority 140 that is used to vouch for proper ownership of the keys. A final element included in laptop 105 is a Dynamic Host Configuration Protocol ("DHCP") server 145 that is used to centrally, dynamically, and temporarily assign Internet Protocol ("IP") address(es) to user 125. DHCP server 145 thus avoids the need for an IP administrator to manually assign an IP address to each user 125 upon the user's connection to system 100.

Figure 2:
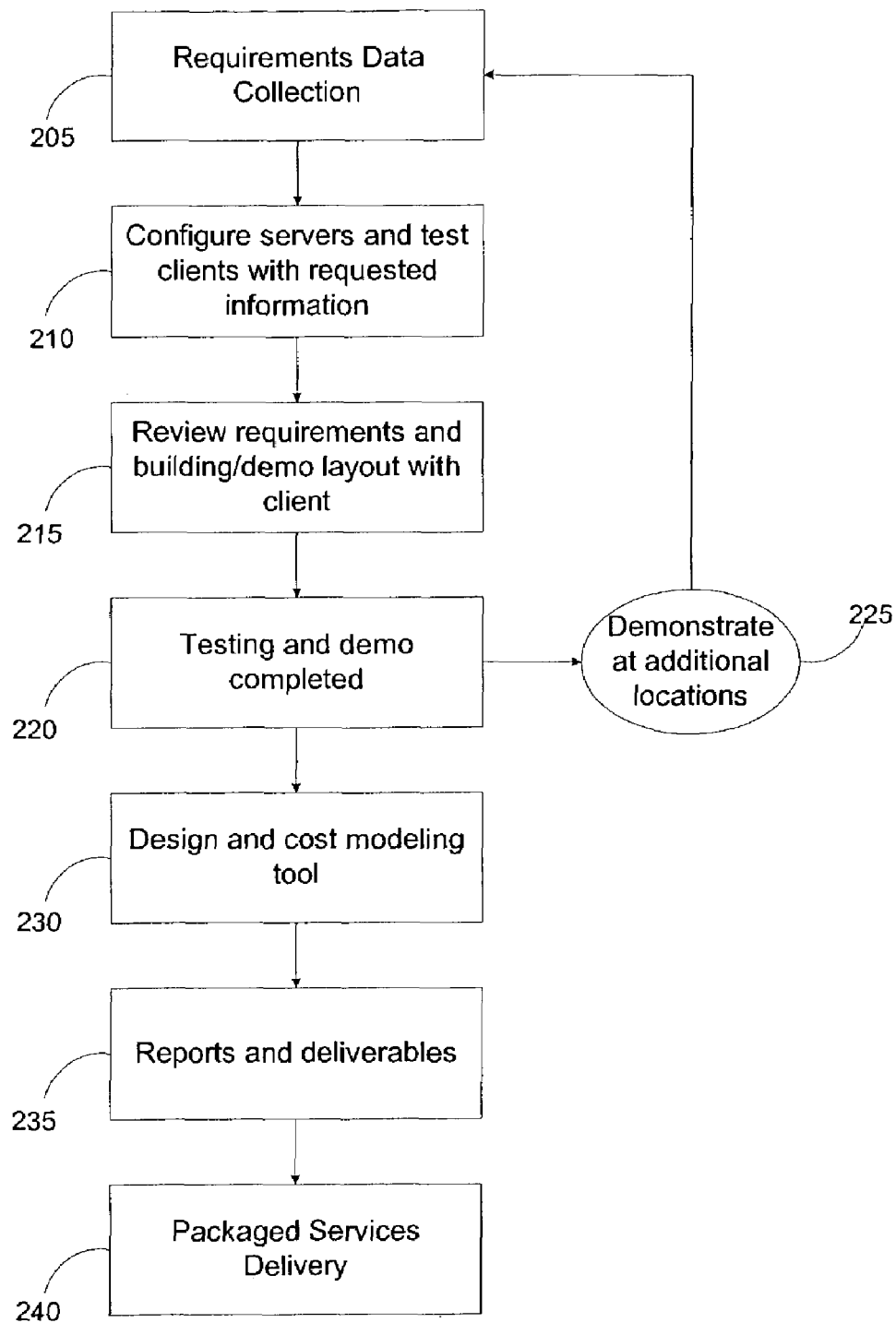
FIG. 2 is a flowchart illustrating a use of the system of FIG. 1 in demonstrating and selling a wireless network.

FIG. 2 is a flowchart illustrating a use of the system 100 in demonstrating and selling a wireless network. In FIG. 2, information about a potential purchaser of a wireless network is accumulated from the customer (205). Such information may include, for example, information about where to install access points 115 and 120 (e.g., location(s) of available Ethernet connections), available IP addresses for assignment to user 125, and other related information. Requirements data may be collected prior to traveling to a customer site to conduct a demonstration of system 100.

Next, the equipment shown in system 100 may be transported to a customer site for a demonstration of a wireless LAN (210). The demonstration includes configuring the RADIUS server 110, the security server 135 (and certificate authority 140), and the DHCP server 145 based on the earlier-collected requirements data, and testing the connection with NIC card 127.

The testing may include allowing the customer to attempt to gain unauthorized access to the system 100. For example, the customer may be invited to bring in a professional "hacker" of networks to try to gain access to the network. As another example, a demonstration could be provided of industry-known devices/techniques for compromising security, such as "data sniffing" or collection tools, such as, for example, "AirSnort," or "NetStumbler." In addition, RF sensors and laptop software may be deployed to show their ability to recognize unsecured or rogue access points as opposed to the demonstrated secured and authorized access points.

The results of the demonstration and testing with respect to the utilized data requirements are then reviewed with the customer (215). At this point, the testing and demonstration at the customer site are essentially completed (220). If necessary, the testing and demonstration can be repeated at other sites and/or with other data requirements (225). Otherwise, a design and cost modeling tool (discussed in more detail below) may be used to estimate to the customer the cost of installing and implementing a wireless network of any desired scale (e.g., building-wide or company-wide) (230). Results of the modeling are then passed on to the customer in the form of reports and deliverables, including, for example, a price quote for installing a full-scale version of the demonstration (see FIG. 5 for more detail) (235). Should the customer then decide to purchase, install, and implement a wireless network, the corresponding WLAN services are packaged, delivered, and installed to the customer (240), using a packaged services process described in detail below with respect to FIG. 6.

Thus, using system 100, a customer can experience advantages of a wireless network. Such advantages include, for example, reduction/removal of the need to install expensive cables and wiring, enhanced roaming ability and ease of use for users, and the potential for very fast connection speeds. Although such advantages can be described to a potential purchaser of wireless networks, a live demonstration of the advantages may have more effect in convincing the customer to select a wireless network.

Moreover, system 100 may be used to convince a customer that conventional obstacles in the installation and use of wireless networks may be overcome. For example, system 100 may be used to convince the customer that the wireless network to be purchased will be secure from those wishing to gain access to private network information. For example, company employee records may need to be kept confidential, both from other employees and from parties external to the company. Similarly, those wishing to gain network access for the purpose of manipulating network information, using network resources, or performing other malicious acts, may also be prevented from doing so.

As a final example of an advantage of system 100, costs for installation, use, and management of a wireless network may be accurately calculated and predicted, thereby further assisting the customer in making a decision regarding whether to purchase a wireless network.

In the following examples, various specifications and techniques are used to demonstrate a wireless network demonstration using system 100. However, various other specifications and techniques may additionally, or alternatively, be used.

In implementing a wireless LAN, a family of specifications known as "802.11" has been developed by the Institute of Electrical and Electronics Engineers ("IEEE"). Generally speaking, 802.11 defines an interface between an access point 115 or 120 and a wireless client such as user 125 (or between two wireless clients). 802.11 includes various specifications, including 802.11, 802.11a, 802.11b, and 802.11g, which differ from one another according to their various different transmission techniques, data transmission rates, transmission ranges, and other communication characteristics.

In implementing an 802.11 specification or other wireless interface, network clients such as user 125 are typically authenticated prior to being granted access to the network. Generally, authentication is a process for proving an identity of the client (user). One type of authentication in the 802.11 standard is known as "open system" authentication, in which a client using, for example, a radio NIC sends an authentication request frame to an access point, and the access point expresses approval or disapproval. Such open system authentication assumes that the client and access point are who they say they are, and generally does not provide appreciable security.

802.11 also offers "shared key" authentication techniques, in which one or more encryption keys are used to encrypt/decrypt the authentication information. The keys are assumed to be private and trusted, so that, theoretically, only an authorized client or access point is allowed to access the wireless network.

A specific type of shared key authentication is based on wired equivalent privacy ("WEP"), which is a security protocol defined as part of the 802.11b standard and intended to make wireless networks at least as secure as wired networks. WEP generally bases authentication on whether the client or other authenticating device has a correct WEP key. More specifically, the client (i.e., the client's radio NIC) sends an authentication request frame to an access point, which then places challenge text into a response and returns it to the radio NIC. The radio NIC encrypts the challenge text with its WEP key and sends the encrypted text back to the access point. The access point then decrypts the challenge text and compares it to the original challenge text for equivalency and corresponding approval of the authentication. Variations of these techniques can similarly be used as part of WEP for encrypting general network transmissions.

Security shortcomings of WEP have been traced to, for example, a relatively short length of the WEP keys, and the fact that the keys generally remain static over long periods of time and/or must be manually re-set. As a result, the same key may eventually be used for different data packets. Given these facts, and given that wireless communications, by definition, will be available over the air, interceptors may be able to intercept enough transmissions to derive the WEP key(s), at which point such interceptors are able to gain unlawful access to the network and/or decrypt network transmissions, until the current WEP key is changed.

Moreover, WEP generally only provides a method for authenticating clients to access points, and not access points to clients (one-way authentication, as opposed to mutual authentication). As a result, an interceptor can impersonate an access point 115 or 120 to gain access to network information.

To assist in overcoming these potential shortcomings of WEP, a generic framework for port-based authentication and key distribution, known as 802.1x, has been developed. 802.1x provides port-based authentication by implementing a security protocol such as the Extensible Authentication Protocol ("EAP"), in which an "authenticator" (e.g., access point 115 or 120) authenticates a "supplicant" (user 125) using the RADIUS authentication server 110 (or some other type of authentication server, such as a Kerberos server, which is another authentication service based on secret-key cryptography). 802.1x also allows for secure key distribution for encrypting traffic between the supplicant and authenticator; for example, the keys might be created by the access point 115 or 120, or supplied by the RADIUS server 110. The fact that 802.1x is port-based, as discussed below, allows the authenticator (access point 115 or 120) to selectively allow different types of traffic to and from the (activated port on the) authentication server 110, particularly during the authentication process.

802.1x-based EAP services thus allow for centralized, user-based authentication and single-user, single session, encryption keys. 802.1x is not actually used to perform encryption; rather, it is a security framework capable of using a number of different authentication and key management methods, where the keys themselves are used to perform encryption.

One key management method, which is known as the temporal key integrity protocol ("TKIP"), combines a temporary key with unique information from each user 125 (such as a media access control ("MAC") address) and a Message Integrity Code ("MIC") to obtain dynamic, unique keys, as opposed to the static keys normally used in WEP. Moreover, TKIP keys are typically longer (e.g., 128 bits versus 40 bits), and are therefore less likely to repeat a key in a given period of time. Other key management/encryption techniques may also be used. One such technique is the Advanced Encryption Standard ("AES"), which, among other differences, uses a different encryption technique (algorithm) than TKIP.

Figure 3:
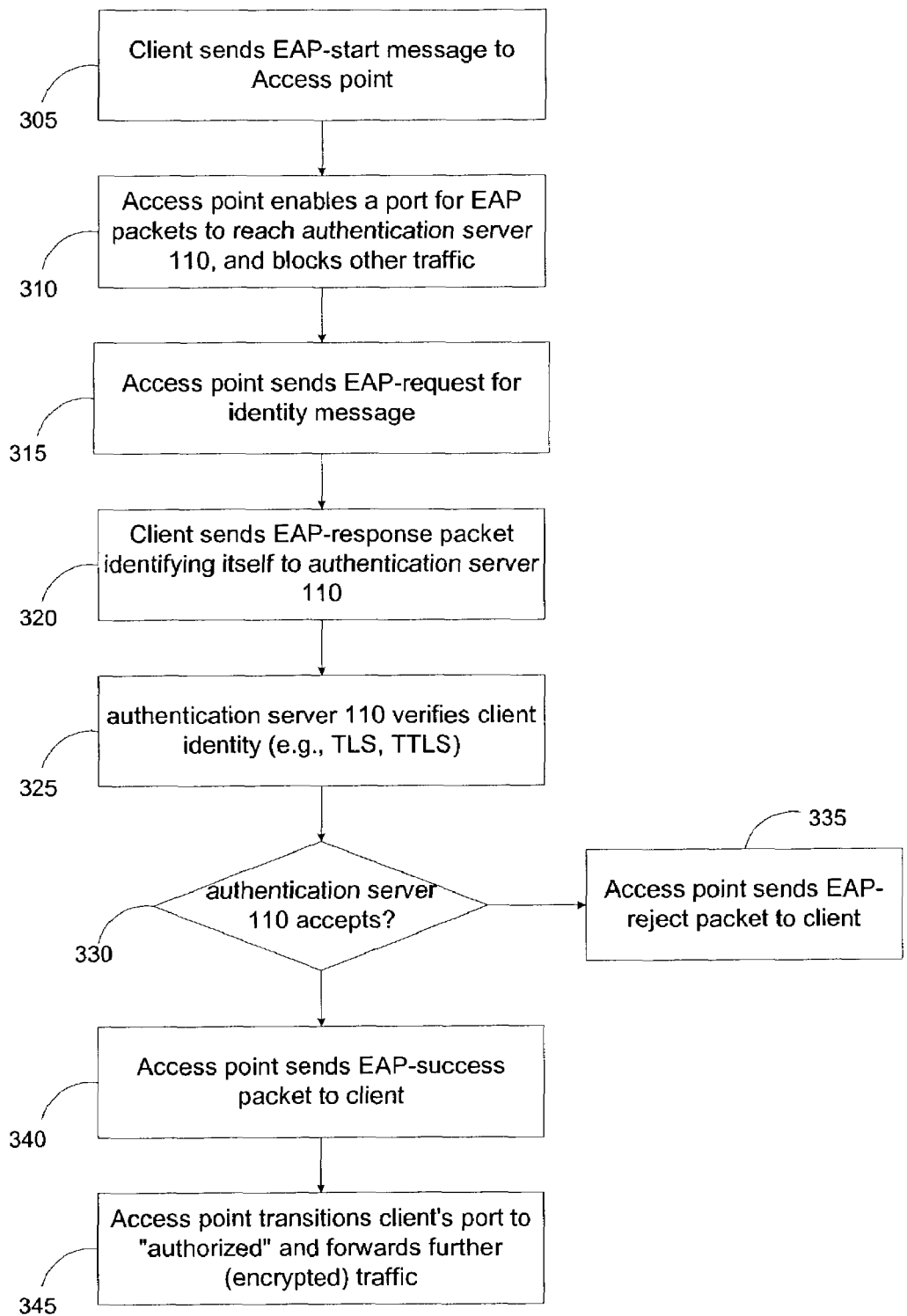
FIG. 3 is a flowchart illustrating an authentication flow for authenticating a user within the system of FIG. 1.

FIG. 3 is a flowchart illustrating an authentication flow for authenticating the user 125 within system 100. More specifically, FIG. 3 illustrates the use of EAP within 802.1x. In FIG. 3, user 125 sends an EAP-start message from a local NIC to an access point 115 (or 120) (305). In response, the access point 115 enables a port for EAP packets to reach the authentication server 110, and concurrently (temporarily) blocks any other traffic from the user 125, such as DHCP or Hyper-text Transfer Protocol ("HTTP"), while the authentication process proceeds (310). Next, the access point 115 sends an EAP-request identity message back to the user 125 (315), and the user 125 replies with a packet identifying itself to authentication server 110 (320).

At this point, the authentication server 110 verifies the identification packet, perhaps using digital certificates and/or other EAP authentication type, such as Transport Level Security ("TLS"), Tunneled Transport Level Security ("TTLS"), Kerberos, or Protected Extensible Authenticate Protocol ("PEAP") (325). As a specific example of an EAP authentication type, TLS (which was originally constructed for wired networks) requires a digital certificate/key obtained from a third-party certificate authority (e.g., certificate authority 140) for both the user 125 and the server 110. Although very secure, problems with TLS include the fact that a wireless user must first connect to a wired network to obtain a certificate, and the fact that a user 125 using multiple machines will typically require multiple certificates.

As another specific example, TTLS, which may be thought of as an extension of TLS, does not require a unique certificate for both sides. Only the authentication server 110 needs a certificate; the user 125 requires only, for example, a copy of the server certificate and a username/password combination to set up a secure TLS "tunnel" for encrypted information. TTLS may be thought of as being analogous to credit card security in the World Wide Web environment, in which a purchaser may securely use a credit card even when only the relevant web server has a digital certificate. Thus, TTLS provides a strong public/private key cryptography that is applicable to wireless networks and allows users to access the networks using only, from their perspective, their normal username/password information.

If authentication is not verified (330), the access point 115 is then authorized to send an EAP-reject packet to user 125 (335). If authentication is verified, then the access point 115 sends an EAP-success packet (340). In the latter case, the access point 115 then switches the port previously associated with user 125 to "authorized," and thereafter forwards further traffic between user 125 and access point 115 (345).

In forwarding the traffic, the traffic may be encrypted using the various WEP encryption techniques discussed herein, such as key-based encryption using dynamic (i.e., updated) keys (e.g., TKIP). The keys can be updated, for example, upon a changing of access points by user 125, after transmission of a pre-defined number of packets, or after a pre-determined amount of time. For example, the encryption keys can (at least initially) be forwarded to the user 125 along with the EAP-success/accept message. Alternatively, a key message can be forwarded which allows the user 125 to define/update encryption keys.

Thus, it should be understood from FIG. 3 that the 802.1X protocol provides effective authentication through the use of an authentication protocol such as EAP (and associated authentication mechanisms such as TLS or TTLS), as well as a framework for various dynamic key management techniques, which may be implemented on an optional or as-needed basis. The authentication, encryption, and various other functions may be implemented in the security server 135, in conjunction with certificate authority 140, user database 130, and RADIUS server 110. The authentication may be mutual, in that both the client and server must authenticate with each other. As opposed to one-way authentication referred to above, mutual authentication not only assures that only authorized users are allowed on the network, but also guards against impersonated access points and other wireless devices not specifically allowed on the network.

Figure 4:
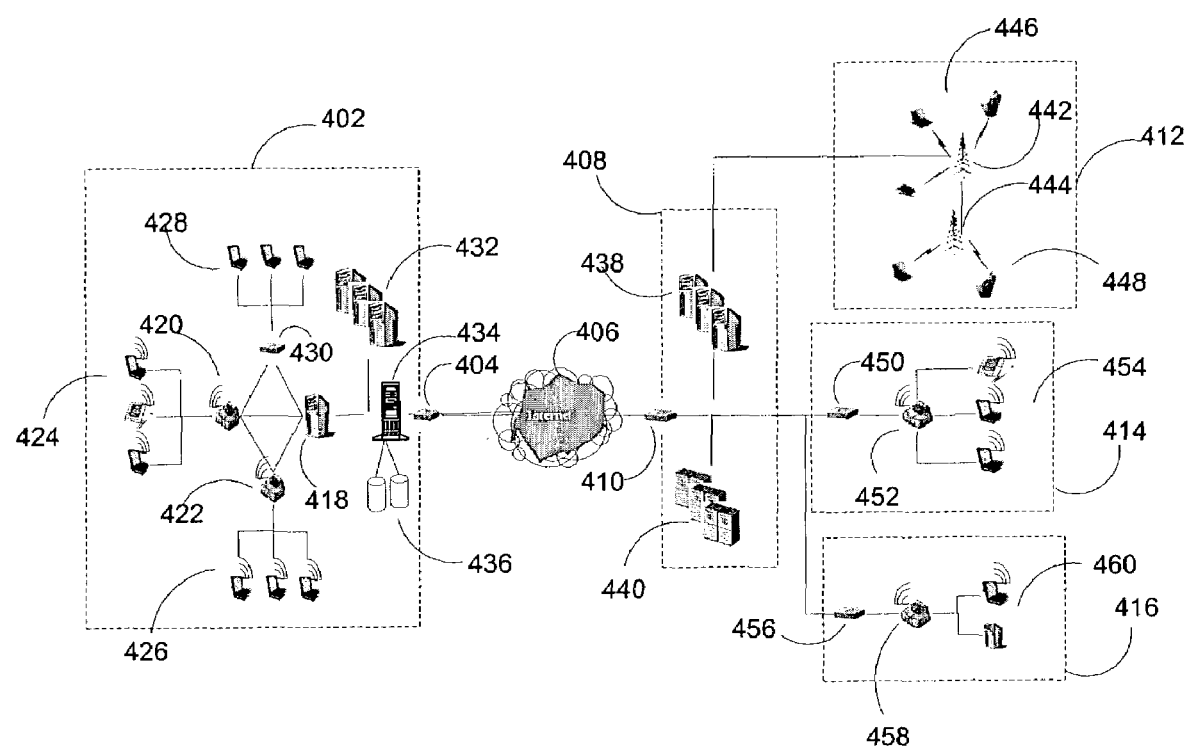
FIG. 4 illustrates a network architecture implementing further uses of the system of FIG. 1.

FIG. 4 illustrates a network architecture implementing further uses of the system 100. In FIG. 4, an enterprise 402 contains various wired and wireless network elements, and uses a router 404 to communicate with a public network 406 such as the Internet. Meanwhile, a global service aggregator 408 is also connected through router 410 to network 406, which in turn is connected to a wireless WAN 412, a public WLAN "hotspot" 414, and a branch office 416 of the enterprise 402.

In the network architecture of FIG. 4, a user of network resources within the enterprise 402 is able to roam anywhere throughout the network architecture. For example, a user sitting at his or her desk within enterprise 402, using either a wireless or wired connection, is able to leave the enterprise and maintain connectivity to the network through WWAN 412 while traveling in a car or on public transportation. The same user may maintain connectivity while stopping at a coffee shop operating as the public WLAN hotspot 414, and may similarly maintain connectivity during travel to, and upon arrival at, branch office 416.

Network elements of enterprise 402 include a demonstration resource 418, which may be, for example, the laptop 105 of FIG. 1 containing security server 135 and related elements. The demonstration resource 418 is connected to an access point 420 and another access point 422, which conduct wireless communication with client devices 424 and 426, respectively, using, for example, the techniques described above with respect to FIGS. 1-3. Further, client devices 428 are connected to the demonstration resource through a local hub 430. RADIUS server(s) 432 are available for use in implementing various authentication and security techniques, such as those described above, and a gateway 434 is used to protect network resources of the enterprise 402 from external eavesdropping and/or manipulation. Finally with respect to the enterprise 402, various legacy and/or web enterprise applications 436 may be available to users of enterprise 402.

Global service aggregator 408 implements authentication, accounting, and authorization services using servers 438, and addresses billing/customer care issues using separate servers 440.

WWAN 412 may be, for example, a single carrier (1×) radio transmission technology ("1×RTT") network, which is a wireless technology based on the Code Division Multiple Access ("CDMA") platform. WWAN 412 may also be a General Packet Radio Service ("GPRS") network, which is a standard for wireless communications, or a Global System for Mobile Communications ("GSM") system. WWAN 412 may include transceiver towers 442 and 444 connected to the global service aggregator 408 and network 406, as well as their associated client groups 446 and 448, respectively.

The WLAN hotspot 414 includes a cable or Digital Subscriber Line ("DSL") modem 450 connected to the global service aggregator 408 and network 406, as well as to an access point 452 and associated client devices 454. Finally, branch office 416 is connected to the global service aggregator 408 and network 406 through a router 456, which in turn is connected to a local access point 458 and its associated client devices 460.

In the network architecture of FIG. 4, the various access points within networks 412, 414, and 416 can connect to network resources of the enterprise 402 using, for example, a Virtual Private Network ("VPN") client installed locally. Such a VPN allows a secure "tunnel" through the gateway 434 using security measures such as, for example, IPSec, which is a security protocol based on public/private key cryptography and/or digital exchange but designed for access to resources behind a gateway such as gateway 434. Thus, a roaming user wishing to obtain a connection with the resources of the network of enterprise 402 may use his or her NIC to log into the network of the enterprise 402, and then boot a VPN client to actually access network resources.

In allowing roaming of a user as described above, a user session may be deconstructed and re-constructed, unknown to the user, as the user moves from one access point to the next. Alternatively, middleware software may be implemented which seamlessly switches the user from one network connection to the next.

Figure 5:
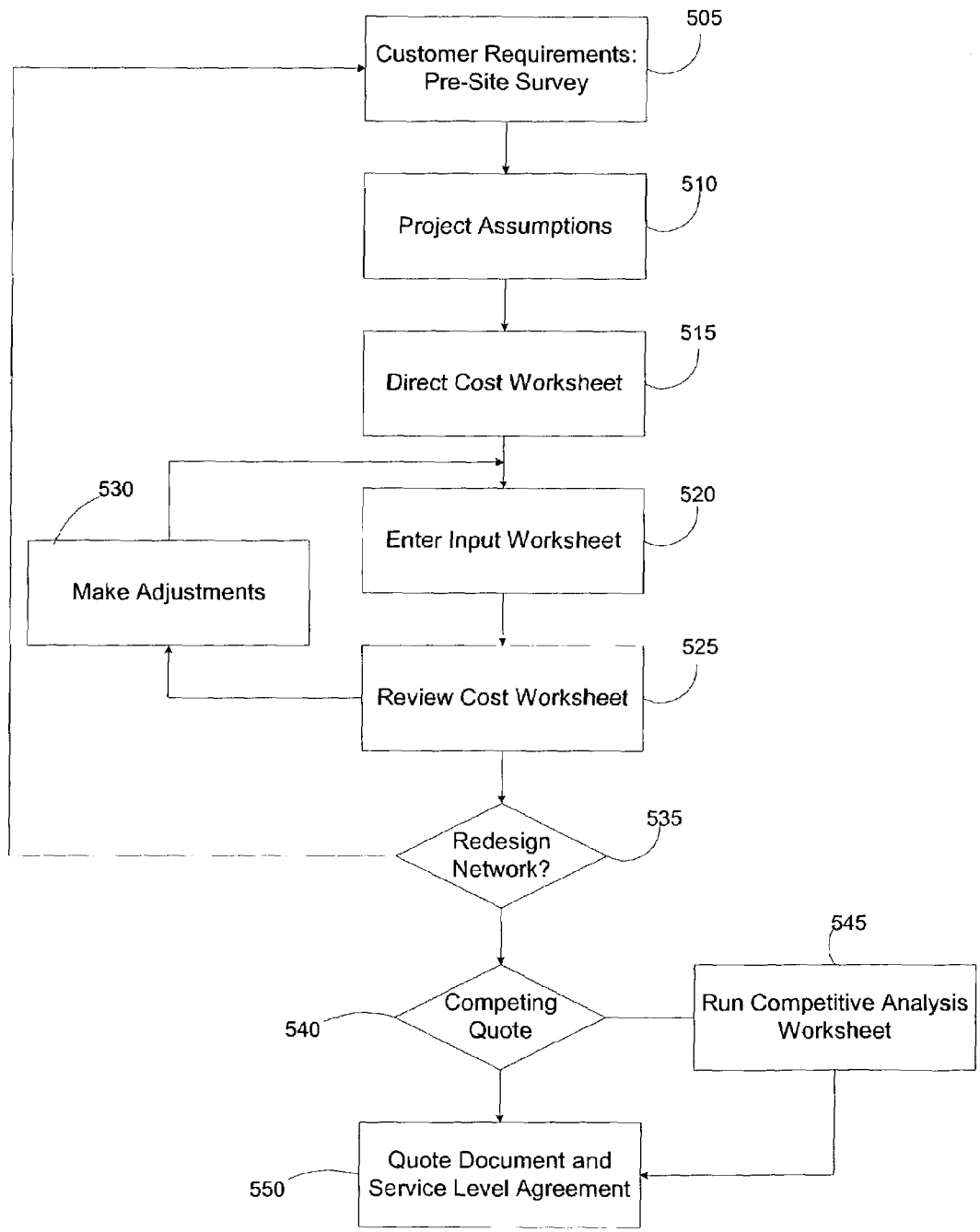
FIG. 5 is a flowchart illustrating a technique for generating a price quote for installing a wireless network.

FIG. 5 is a flowchart illustrating a technique for generating a price quote for installing a wireless network. After demonstration of a wireless network is completed as described above, a cost estimate for installing an actual, full-scale network can be generated for quoting to the customer.

One technique for generating such a price quote involves the use of electronic spreadsheet software that includes various worksheets that are pre-formatted for generating the price quote. Some of the worksheets, or parts thereof, are designed to input data from a user of the spreadsheet software, such as a total square footage to be covered by the wireless network, or the number of buildings to be connected. Others of the worksheets, or parts thereof, are designed to input data from different worksheets. The price quote process can be performed iteratively, based on further input from the customer, and price comparisons can be made with respect to any quotes generated by competitors.

Possible worksheets include a pre-site survey worksheet for gathering information about the customer site, such as its square footage, operational hours, number of users, number of user applications, radio frequency ("RF") coverage problems or considerations, and shelving/rack availability for required servers. Customer information may also include information about an existing network at the customer site, if any. In FIG. 5, the pre-site survey is the first worksheet used (505).

Once the pre-site survey has been filled out, an assumption worksheet may be utilized (510). The assumption worksheet sets forth assumptions about various network elements and conditions. For example, assumptions may be made about an extent to which access point coverage areas should overlap, the number of users to be handled by an access point, types of access points and other network elements that will be used, an amount of maintenance required, applicable sales tax, depreciation of equipment, and labor costs for installation and training of local personnel. Next, a direct cost worksheet listing actual prices for different brands or types of the various individual network elements provides information to compliment the pre-site survey and project assumptions (515).

Based on the pre-site survey worksheet, the project assumptions worksheet, and the direct cost worksheet, an input worksheet can be completed (520). As mentioned above, the input worksheet may be partially filled out by a human operator reading the previous worksheets, and/or data from the previous worksheets may be input directly from those worksheets into the input worksheet. The input worksheet may also include fixed data that is common to all or almost all installations, such as certain types of taxes.

A cost worksheet may be filled in for review, based on the input worksheet (525). The cost worksheet considers various costs and cost descriptions, such as recurring versus non-recurring costs, capital costs, overhead costs, or annual costs. The cost worksheet analyzes these costs in the context of the particular customer and/or over a lifetime of a particular service agreement, and determines a net positive/negative margin for the network provider. Adjusting these values in an iterative process with the input worksheet allows the network provider to install the network in a cost-effective way, and to maximize potential profit in the context of a particular customer's demands (530). For example, the network provider may determine that a customer prefers to pay as little as possible up front, and may therefore attempt to shift non-recurring costs into recurring or deferred costs as much as possible, while still maintaining satisfactory profitability for the installation.

Based on the cost worksheet, it may be necessary to redesign the proposed network to meet whatever cost constraints exist (535), in which case the proposed site information is modified accordingly. Otherwise, it is determined whether there are any quotes from competing network providers (540). If so, a competitive analysis worksheet may be implemented which compares the various features of the proposed network to the competing network (545).

Finally, a quote document and service level agreement worksheet may be generated in accordance with the earlier worksheets (550). This worksheet which inputs most or all of the various factors outlined above and outputs a quote for periodic and/or non-recurring charges, as well as a description of services assumed in generating the quote. The quote document may present these costs in pie chart form or other format. Multiple quotes, each for different proposed implementations of the network(s), may be included.

Figure 6:
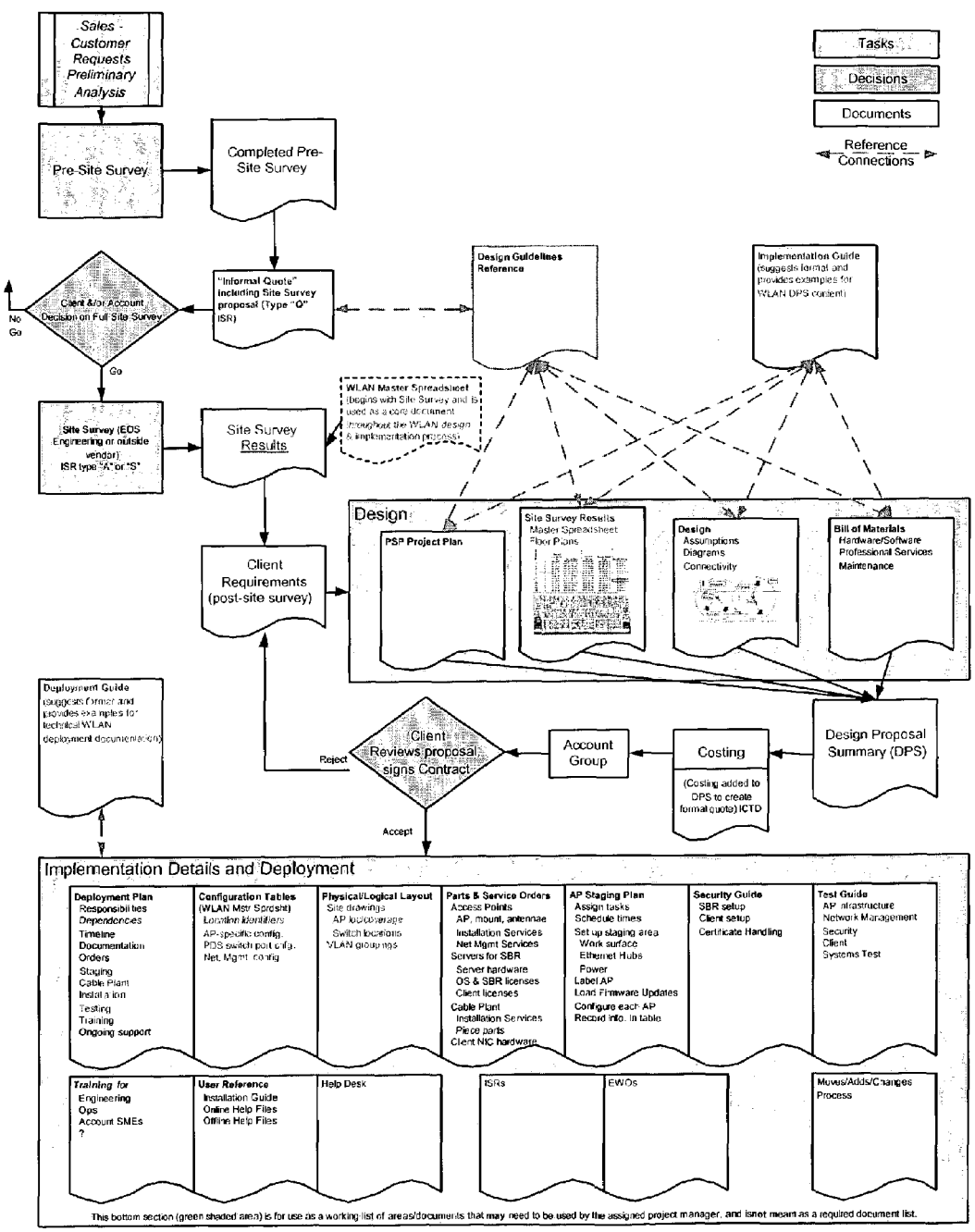
FIG. 6 is a flowchart illustrating a packaged service process for a network installation.

FIG. 6 is a flowchart illustrating a packaged service process for a network installation. FIG. 6 generally describes examples of tasks, decisions, and documents that are used in interacting with a customer to design, implement, and deploy a network such as a wireless LAN.

In conclusion, network demonstration techniques have been disclosed which allow a fully-operational, secure wireless network to be implemented at a customer location. Using only a portable authentication server, a laptop computer, and at least two access points, a wireless network can be set up at the customer location within a matter of minutes, so that a user of a portable computing device having an appropriate network interface card is able to roam throughout a predetermined portion of the customer location with the benefit of a wireless connection to one of the access points. The laptop computer may contain software integrating the functionality of a security server, a user authentication database, and other components necessary to implement the wireless network. The user may also be able to communicate with the laptop computer and authentication server from locations external to the customer location, perhaps using a wireless wide area network or secondary wireless local area network. Using the network demonstration and related information about the customer, accurate cost estimates for installing a company-wide wireless network can be generated.

A number of implementations have been described. Nevertheless, it will be understood that various modifications may be made. Accordingly, other implementations are within the scope of the following claims.

What is claimed is:

1. A method of demonstrating a wireless network comprising:
    transporting an authentication server to a customer location, the transported authentication server being operable to implement a user-specific and session-specific security policy for authenticating a user, the customer location comprising a proposed installation location for a wireless network;
    transporting a security server to the customer location, the transported security server being operable to interact with the authentication server and a user database storing user-specific authentication information to implement the security policy;
    prior to transporting the authentication server and the security server to the customer location, obtaining customer information including an available network address and the user-specific authentication information associated with the user;
    creating a secure wireless network at the customer location using at least the transported authentication server and the transported security server;
    activating a port on the authentication server; and
    authenticating the user at the port on the authentication server, using the security server and a first portable computing device operated by the user, via a wireless connection to the secure wireless network.

2. The method of claim 1 wherein transporting the security server comprises integrating the security server and the user database onto a second portable computing device.

3. The method of claim 2 wherein integrating the security server and the user database comprises integrating a certificate authority onto the second portable computing device, the certificate authority operable to provide and validate a digital certificate for use in implementing the security policy.

4. The method of claim 2 wherein integrating the security server and the user database comprises integrating a network address assignment server onto the second portable computing device, the network address assignment server operable to assign a network address to the first portable computing device.

5. The method of claim 1 further comprising:
    obtaining, for the customer location, a first connection location and a second connection location; and
    transporting a first wireless access point and a second wireless access point for installation at the first connection location and the second connection location, respectively, such that the transported first access point and the transported second access point are in communication with the security server.

6. The method of claim 5 wherein the first portable computing device is operable to communicate with the first wireless access point, via a wireless network interface card, when the first portable computing device is within a pre-determined distance of the first wireless access point.

7. The method of claim 6 further comprising transporting the first portable computing device to the customer location with the network interface card pre-installed and pre-configured.

8. The method of claim 6 further comprising installing the network interface card on the first portable computing device, wherein the first portable computing device is supplied by the user.

9. The method of claim 1 further comprising storing the user-specific authentication information in the user database prior to transporting the authentication server and the security server to the customer location.

10. The method of claim 9 wherein authenticating the user comprises authenticating the user based on the network address and the user authentication information.

11. The method of claim 1 further comprising encrypting data traffic between the user and the security server that is subsequent to authenticating the user, using an encryption/decryption key.

12. The method of claim 11 wherein the encryption/decryption key is changed after a predetermined period of time.

13. The method of claim 11 wherein the encryption/decryption key is changed after a predetermined amount, of the data traffic has been transmitted.

14. The method of claim 11 wherein the encryption/decryption key is changed upon a beginning of a new session by the user.

15. The method of claim 14 wherein the beginning of the new session is defined by an ending of a first communication between the user and a first access point communicating with the security server and a beginning of a second communication between the user and a second access point communicating with the security server.

16. The method of claim 1 wherein the first portable computing device maintains the wireless connection to an access point located at a site external to the customer location.

17. The method of claim 16 wherein the access point located at the external site is a broadcasting tower implementing a wireless wide area network.

18. The method of claim 16 wherein the access point located at the external site is connected to the security server via a wide area network and through a gateway device at the customer location.

19. The method of claim 1 further comprising authenticating the user at the security server and via a gateway device located at the customer location, while the user is at a location external to the customer location.

20. The method of claim 1 further comprising implementing an automated method of pricing a potential wireless network based on the demonstrated wireless network and using a computer programmed with spreadsheet software, the automated method comprising:
   inputting a first data set describing physical characteristics of the customer location into the spreadsheet software;
   inputting a second data set describing existing network conditions at the customer location into the spreadsheet software;
   inputting a third data set describing customer-desired characteristics of the potential wireless network into the spreadsheet software; and
   estimating a cost for installing the potential wireless network, based on the first data set, second data set, and third data set.

21. The method of claim 1 further comprising connecting the created wireless network with a wired network existing at the customer location.

22. A system for demonstrating a wireless network at a remote location comprising:
   a first portable access point;
   a second portable access point;
   a database containing user authentication information, the user authentication information pre-loaded into the database;
   a portable authentication server operable to implement a user-specific and session-specific security policy;
   a portable security server operable to interact with the database and the portable authentication server to activate a port on the portable authentication server; and
   a first portable computing device including a wireless network interface card operable to communicate with the portable security server through the first portable access point and the second portable access point,
   wherein a user of the portable computing device is authenticated at the port on the portable authentication server to a secure wireless network created at the remote location using the portable authentication server, the portable security server, and at least the access points, based on the pre-loaded user authentication information and the security policy, the remote location comprising a proposed installation location for a wireless network.

23. The system of claim 22 wherein the portable security server and the database are integrated onto a second portable computing device.

24. The system of claim 23 wherein a certificate authority is integrated onto the second portable computing device, and further wherein the certificate authority is operable to provide and validate a digital certificate for use in implementing the security policy.

25. The system of claim 23 wherein a network address assignment server is integrated onto the second portable computing device, and further wherein the network address assignment server is operable to assign a network address to the first portable computing device.

26. The system of claim 22 wherein data traffic between the user and the security server that is subsequent to authenticating the user is encrypted using an encryption key.

27. The system of claim 26 wherein the encryption key is changed after a predetermined period of time.

28. The system of claim 26 wherein the encryption key is changed after a predetermined amount of the data traffic has been transmitted.

29. The system of claim 26 wherein the encryption key is changed upon a beginning of a new session by the user.

30. The system of claim 22 wherein the first portable computing device maintains a wireless connection to an access point located at a site external to the portable security server and portable authentication server.

31. The system of claim 22 wherein the access point located at the external site is a broadcasting tower implementing a wireless wide area network.

32. The system of claim 22 wherein the access point located at the external site is connected to the portable security server via a wide area network and through a gateway device co-located with the portable security server and the portable authentication server.

33. The system of claim 22 wherein the user is authenticated at the security server and via a gateway device co-located with the portable security server and the portable authentication server, via a wide area network that is external to the gateway device.

* * * * *